United States Patent [19]
Ishida et al.

[11] 4,137,158
[45] Jan. 30, 1979

[54] PROCESS FOR TERTIARY TREATMENT OF WASTE WATERS FROM ANAEROBIC DIGESTION TREATMENT PROCESS

[75] Inventors: Masahiko Ishida; Ryooichi Haga; Youji Odawara, all of Hitachi, Japan

[73] Assignee: Hitachi, Ltd., Tokyo, Japan

[21] Appl. No.: 753,207

[22] Filed: Dec. 22, 1976

[30] Foreign Application Priority Data

Dec. 25, 1975 [JP] Japan .................... 50-156248

[51] Int. Cl.$^2$ .................... C02B 1/20; C02C 1/14
[52] U.S. Cl. .................... 210/16; 71/10; 71/12; 210/18; 210/28; 210/48; 210/53; 210/DIG. 28; 210/DIG. 29
[58] Field of Search .................... 71/10, 12; 210/2-10, 210/12, 16, 18, 27, 28, 32, 38 R, 45, 48, 51-53, 56, 66, 152, 188, 199-202, 269, DIG. 28, DIG. 29

[56] References Cited
U.S. PATENT DOCUMENTS

| | | | |
|---|---|---|---|
| 3,236,766 | 2/1966 | Levin | 210/16 |
| 3,423,309 | 1/1969 | Albertson | 210/5 |
| 3,475,330 | 10/1969 | Gilles | 210/38 R |
| 3,546,111 | 12/1970 | Busch | 210/DIG. 29 |
| 3,586,625 | 6/1971 | Cole et al. | 210/DIG. 29 |
| 3,842,000 | 10/1974 | Dawson | 210/38 R |
| 3,930,998 | 1/1976 | Knopp et al. | 210/16 |

FOREIGN PATENT DOCUMENTS

50-78153 6/1975 Japan .................... 210/51

Primary Examiner—Charles N. Hart
Assistant Examiner—Peter A. Hruskoci
Attorney, Agent, or Firm—Thomas E. Beall, Jr.

[57] ABSTRACT

A process for the tertiary treatment of biochemical waste waters comprising the following 4 main steps; (1) adding milk of lime to waste water from the anaerobic digestion treatment process to render the waste water alkaline and recovering $NH_3$ by reduced pressure distillation, (2) contacting recovered $NH_3$ with a weakly acidic ion exchange resin to make $NH_3$ adsorbed in the ion exchanger resin, (3) adding acid to the adsorbed ammonia to form an ammonia salt, and (4) blowing $CO_2$ into the treated water from which $NH_3$ has been removed, to thereby recover P, and subjecting the treated water from which N and P have been removed to the activated sludge treatment to remove BOD.

4 Claims, 3 Drawing Figures

PROCESS FOR TERTIARY TREATMENT OF WASTE WATERS FROM ANAEROBIC DIGESTION TREATMENT PROCESS

BACKGROUND OF THE INVENTION

The present invention relates to the anaerobic digestion treatment of biochemical wastes. More particularly, the invention relates to a possess for removing BOD (biological oxygen demand) and nitrogen and phosphorus from waste water discharged from the process of the anaerobic digestion treatment of a biochemical waste.

The anaerobic digestion treatment of biochemical wastes have heretofore been adopted for treating wastes having a high BOD value, for example, excessive activated sludges, excretions and waste waters from the alcohol distillation process. The anaerobic digestion treatment has recently attracted attention in the art because of various advantages. For example, since the digestion gas generated as a by-product can be used as the energy source of the treatment apparatus, the treatment cost is low, and the digestion sludge discharged as a by-product can be used as a high quality organic fertilizer.

One example of such anaerobic digestion treatment is disclosed in the specification of U.S. Patent Application Ser. No. 685,901 filed on May 12, 1976 now U.S. Pat. No. 4,067,801, and this treatment process comprises the following two main steps; the primary treatment step of subjecting the starting waste water to pulverization, heating and acid addition to form an organic slurry, and the secondary treatment step of subjecting the organic slurry to anaerobic fermentation in the presence of bacteria to decompose it to digested sludge and methane gas. In general, since BOD is left at a concentration of several hundred ppm in the anaerobically treated water (the effluent separated from the digested sludge by solid-liquid separation), the treated water is diluted and subjected to the aerobic digestion treatment to remove BOD therefrom and then, the treated water is discharged into sewerage or the like. This discharged water still contains 500 to 800 ppm of nitrogen and about 10 ppm of phosphorus. Accordingly, the anaerobic digestion treatment involves a problem of occurrence of secondary pollution by promotion of eutrophication of rivers, seas and the like by nitrogen and phosphorus contained in discharged water. As means for removal of nitrogen and phosphorus, there are known physical, chemical and biological processes, but there is not known a process for removing nitrogen and phosphorus from waste waters from the anaerobic digestion treatment process.

SUMMARY OF THE INVENTION

It is a primary object of the present invention to provide a process for removing efficiently BOD, nitrogen and phosphorus from anaerobically treated waste waters.

Another object of the present invention is to provide a process for separating nitrogen and phosphorus from anaerobically treated waste waters and obtain an organic fertilizer containing nitrogen and phsophorus as a by-product of the anaerobic digestion treatment.

The present invention includes the following 4 main features for attaining the foregoing objects. The first feature is that lime is added to treated water from the anaerobic digestion treatment process to render the treated water alkaline and the treated water is separated into ammonia and ammonia-free treated water. The second feature of the present invention is that ammonia separated from the treated water is adsorbed. The third feature of the present invention is that an acid is added to adsorbed ammonia to form an ammonia salt. The fourth feature of the present invention is that the treated water from which ammonia has been separated is contacted with carbon dioxide gas, so that phosphorus-containing solids are separated from the treated water, and the treated water from which the solids have been removed is subjected to aerobic digestion treatment.

DETAILED DESCRIPTION OF THE PREFERRED EMBODIMENTS

Figure 1:
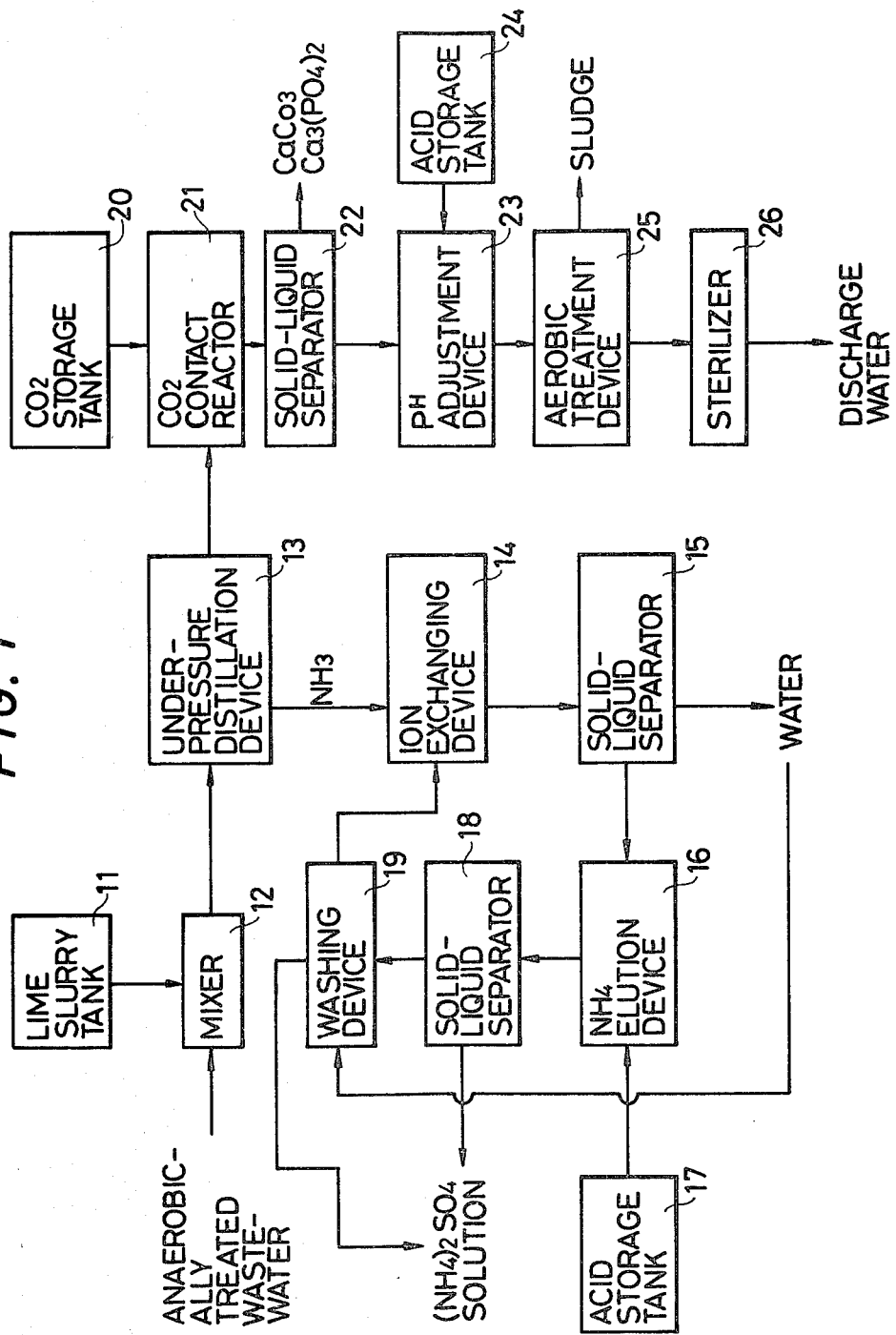
FIG. 1 is a block diagram illustrating one embodiment of the present invention.

One embodiment of the present invention will now be described by reference to FIG. 1.

At the first step of the process of the present invention, a lime slurry is added to treated water from the anaerobic digestion treatment process (anaerobically treated waste water) to render it alkaline, and the waste water is separated into ammonia-containing treated water and ammonia-free treated water. Unslaked lime or slaked lime in a lime slurry tank 11 is added to anaerobically treated waste water to adjust the pH above 10. A higher pH value of the treated water is more advantageous for gasification of $NH_3$ but if the pH is too high, the pH must be adjusted again at the subsequent steps. Accordingly, it is preferred that the pH be adjusted in the range of from 10.3 and 11.0. In general, the pH of the starting treated waste water is slightly alkaline and the pH is about 7.2 to about 8.0. Therefore, good results are obtained when lime is added only in a minute amount. More specifically, lime is ordinarily added at a concentration of at least about 100 ppm as calculated as slaked lime, though the concentration is varied to some extent depending on the kind and solid content of the starting treated waste water and the kind and quality of the lime. Slaked lime or unslaked lime is added to the treated water under agitation in a mixer 12 as it is in a solid form or in the form of a lime slurry. The treated water which has been rendered alkaline to facilitate removal of ammonia is subjected to reduced pressure distillation in an under-pressure distillation device 13 to remove $NH_4^{30}$ in the form of aqueous ammonia. In the distillation device 13, the pressure must be reduced to about 200 mmHg or lower, preferably 100 mmHg or lower. Since the anaerobic treatment is carried out at a temperature of 40° to 55° C., at the reduced pressure distillation step the intended object can be attained only by heating the treated water slightly. If the initial distillate in an amount of 5% by volume of the treated water is collected by reduced pressure distillation, about 90% of ammonia contained in the treated water can be recovered, and when the distillate in an amount of 50% by volume of the starting treated waste water is collected, more than 98% of ammonia contained in the treated water can be recovered.

At the second step of the process of the present invention, ammonia-containing water separated and recovered from the treated water is passed through a weakly acidic $H^+$ type ion exchanging device 14 to make ammonia adsorbed therein. For the weakly acidic ion exchanging device 14, a carboxyl group-containing ion exchange resin activated to the $H^+$ type is preferably employed. An ion exchange cellulose and a weakly acidic ion exchange dextran may be used, but since they are inferior in the solid-liquid separating capacity and the mechanical or chemical strength, it is not preferred to use them. The contact of the ion exchanger with the distillate (ammonia-containing water) may be accomplished by dipping the ion exchanger in the distillate or passing the distillate through a column packed with the ion exchanger. The reason a weakly acidic $H^+$ ion type exchanger is used for removing ammonia from the ammonia-containing distillate is as follows:

When an weakly acidic ion exchange in which $NH_4^+$ has been adsorbed is acidified with a strong acid, adsorbed $NH_4^+$ can easily be released and if the ion exchanger is washed with water, it can easily be regenerated.

If it is intended to recover $NH_4^+$ directly from the anaerobically treated water by using a weakly acidic ion exchanger, since inorganic acid radicals such as $Cl^-$, $SO_4^{--}$ and $PO_4^{---}$ are present in the treated waste water, functional groups of the weakly acidic ion exchanger are not dissociated and hence, the intended removal cannot be attained.

When a strongly acidic ion exchanger is employed, alkali metal ions or alkaline earth metal ions having a higher basicity than $NH_4^+$ are predominantly adsorbed, and therefore, a large quantity of the ion exchanger must be employed. Moreover, proteins and other macromolecular substances are adsorbed on the ion exchanger and slimes are deposited on the surface of the ion exchanger, resulting in drastic reduction of the function and shortening of the life in the ion exchanger.

As will be apparent from the foregoing illustration, if the anaerobically treated waste water is not directly subjected to the ion exchange treatment but ammonia is once separated from the treated waste water and it is then adsorbed in a weakly acidic ion exchanger, adsorption and regeneration can be accomplished very effectively and advantageously. Thus, the connection of separation of ammonia from the treated waste water with adsorption of ammonia on a weakly acidic ion exchanger is of great significance and various advantages such as detailed hereinafter can be attained with respect to recovery and utilization of water and the like by the connection of the above two steps.

At the third step of the process of the present invention, the $NH_4^+$-adsorbed ion exchanger is separated from water, and the ion exchanger is treated with an acid to remove ammonia and regenerate the ion exchanger. More specifically, the $NH_4^+$-adsorbed ion exchanger is separated from water at a solid-liquid separator 15 for which known means such as decantation, filtration and centrifugal separation can be adopted. The ion exchanger separated from water is fed to an ammonia elution device 16 and contacted with an acid in an acid storage tank 17 to thereby dissolve out and elute $NH_4^+$. The functional groups of the ion exchanger are easily dissociated by contacting them with an acid having a higher degree of dissociation than the carboxyl group. Cheap mineral acids such as sulfuric acid, hydrochloric acid and acetic acid can be used for this elution treatment. In view of utilization of the $NH_4^+$-containing liquid formed as a by-product, use of sulfuric acid or hydrochloric acid is preferred. Dibasic and polybasic organic acids such as citric acid may be used. The ion exchanger dissociated in the $NH_4^+$ elution device is fed to a solid-liquid separator 18 to separate the acid liquid therefrom, washed with water in a washing device 19, then packed in the ion exchanging device 14 and used again for adsorption of ammonia. Water separated at the solid-liquid separator 15 can be used as the washing water in the washing device 19. This water is very close to distilled water and is very suitable as the washing water for the ion exchanger. The washing of the ion exchanger is performed for washing away acid radicals adhering to the ion exchanger, and satisfactory results are obtained when the ion exchanger is washed with the washing water in an amount corresponding to 1/5 to ½ of the volume of the ion exchanger. Since ammonium ions are contained in the water from the washing device 19, if it is combined with the acid liquid separated at the solid-liquid separator 18, an aqueous solution of ammonium sulfate $[(NH_4)_2SO_4]$ or the like can be recovered.

At the fourth step of the process of the present invention, the treated water from which ammonia has been removed is contacted with carbon dioxide gas to separate a phosphorus-containing solid from the treated water. A gas containing carbon dioxide gas is meant by the term "carbon dioxide gas" used in the instant specification and claims. This gas is stored in a $CO_2$ storage tank 20. A digestion gas formed as a by-product at the anaerobic digestion step can be used as the carbon dioxide gas. The contact of the treated water with carbon dioxide gas is performed in a $CO_2$ contact reactor 21. Carbon dioxide gas blown continuously or intermittently into the reactor 21 converts $Ca^{2+}$ and $Ca(OH)_2$ to calcium carbonate and deposits calcium phosphate and other suspended solid found at the alkalization step in the mixer 12 onto the precipitate of calcium carbonate. The solid thus separated in the reactor 21, which comprises as the main components calcium carbonate, calcium phosphate, organic solids and iron sulfide, is separated and removed from the treated water at a solid-liquid separator 22. Conventional means such as filtration and precipitation can be adopted for the solid-liquid separator 22. The treated water from which the solid has thus been removed contains BOD, and the treated water is subjected to an aerobic treatment for removing BOD therefrom. It is preferred to adjust the pH of the treated water prior to the aerobic treatment. The treated water is introduced into a pH adjustment device 23 and the pH is adjusted by an acid added from an acid storage tank 24, for example, sulfuric acid. In general, it is preferred that the pH be adjusted to 6.0 to 7.5 for the aerobic treatment. In many cases, the pH of the treated water is already kept in this preferred range in the $CO_2$ contact reactor 21, and the pH adjustment step can omitted in such case.

After the pH adjustment, the treated water is introduced into an aerobic treatment device 25. Any of treatment methods effective for reducing the BOD level, for example, the known activated sludge method, the method using a rotating biological contactor such as disclosed in the specification of U.S. Pat. No. 3,516,929, the trickling filtration method and the biological slime fixed type catalytic oxidation method, can be adopted for the aerobic treatment device 25. Since substantial portions of inorganic nitrogen and inorganic phosphorus have been removed from the treated water introduced into the aerobic treatment device 25, the composition of the treated water is one suitable for the aerobic treatment. Accordingly, dilution of the treated water as performed in the conventional processes need not be carried out. The treated water from which BOD has been removed at the aerobic treatment device 25 is introduced into a sterilizer 26 and after sterilization, the treated water is discharged into sewerage. The sludge formed at the aerobic treatment step is utilized as an organic fertilizer.

Figure 2:
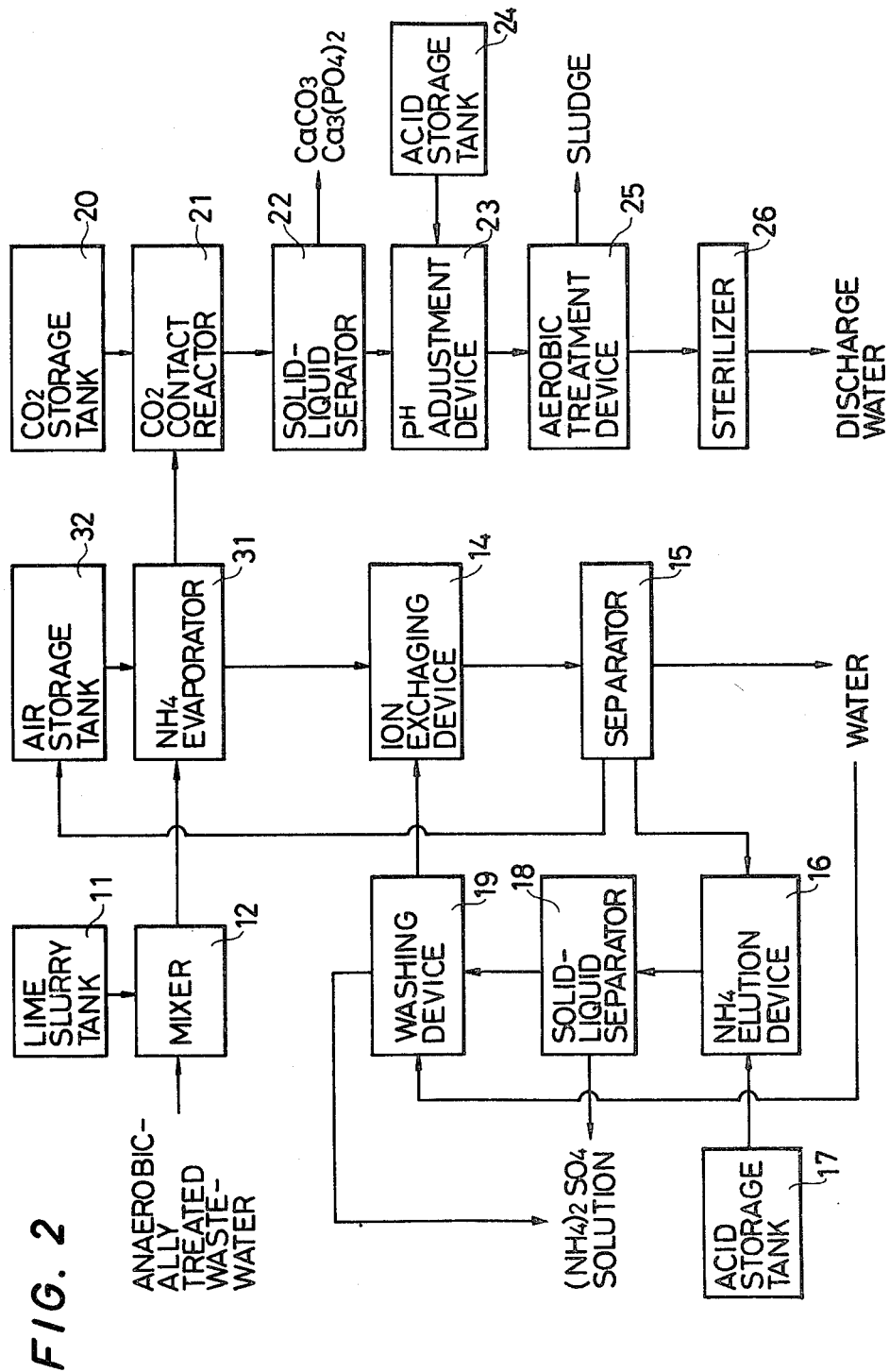
FIG. 2 is a block diagram illustrating another embodiment of the present invention.

FIG. 2 illustrates another embodiment of the present invention, which is different from the embodiment shown in FIG. 1 in the point that ammonia is gasified and recovered. Members indicated by the same reference numerals as in FIG. 1 have the same functions as described above by reference to FIG. 1. Accordingly, description of these members are omitted.

The treated waste water which has been rendered alkaline in the mixer 12 is introduced into an ammonia evaporator 31 and $NH_3$ is evaporated by aeration. Evaporation of $NH_3$ by aeration is accomplished by blowing a gas stored in an air storage tank 32 into the evaporator 31 consisting of a sealed vessel and withdrawing an $NH_3$-containing gas from the evaporator 31. The pressure in the evaporator 31 may be atmospheric, but if the pressure in the evaporator 31 is reduced, ammonia is evaporated effectively. Air or nitrogen is preferably used as the aeration gas. When a $CO_2$-containing gas is used for aeration, alkaline components in the treated water are neutralized and the pH is lowered, with the result that gasification of $NH_3$ becomes difficult. Accordingly, it is preferred that nitrogen or air decarbonated by alkali washing be used for the aeration and the gas recovered from the solid-liquid separator 15 be used repeatedly. The amount of the aerating gas to be blown into the evaporator 31 is changed depending on the contact efficiency of the evaporator 31, but in general, it is necessary that the amount of the aerating gas must be at least 20 times the amount of the treated water. The ammonia-containing gas recovered at the evaporator 31 is introduced into the ion exchanging device 14, and $NH_4^+$ is adsorbed on the ion exchanger in the same manner as described above by reference to the embodiment shown in FIG. 1. In this embodiment, in order to perform adsorption of $NH_4$ efficiently, it is preferred that the ion exchanger be wetted.

Figure 3:
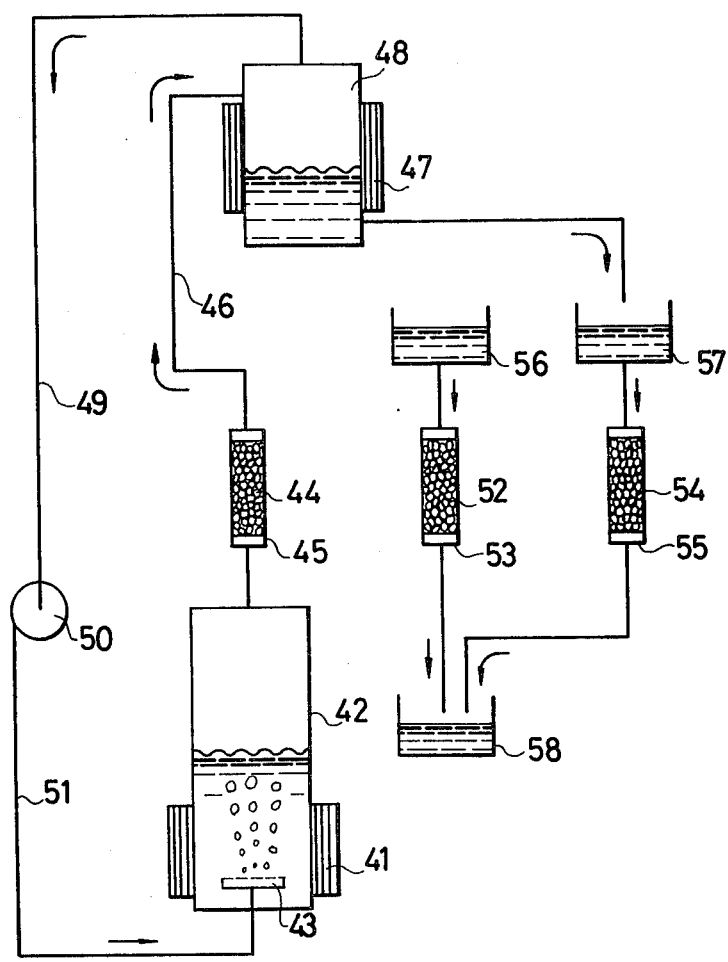
FIG. 3 is a flow diagram showing the apparatus for working the embodiment shown in FIG. 2, especially an ammonia evaporator, a moisture separator and an ion exchanger.

A specific example of the assembly of the $NH_4$ evaporator 31, the ion exchanging device 14, the separator 15 and the washing device 19, which have been illustrated by reference to FIG. 2, is shown in FIG. 3.

Waste water which has been subjected to the anaerobic treatment and the alkalization treatment is fed to an $NH_4$ evaporator 42 having a heating jacket 41, and ammonia in the treated water is gasified by nitrogen aerated from an aerating plate 43 of molten glass disposed in the bottom of the evaporator 42 and is then introduced into an ion exchanging column 45 packed with an ion exchange resin 44 and disposed above the evaporator 42, where the gasified ammonia is adsorbed in the ion exchange resin 44. The nitrogen-containing gas from which ammonia has thus been removed is introduced through a pipe 49 into a moisture separator 48 provided with a heating jacket 47, where the gas is separated into nitrogen gas and water. The recovered nitrogen gas is recycled to the evaporator 42 through a pipe 49, a pump 50 and a pipe 51 and used again for gasification of ammonia. Water separated at the separator 48 is used as the washing water for regeneration of the ion exchange resin having ammonia adsorbed therein. In this embodiment, in order to perform recycling of adsorption, desorption and regeneration of the ion exchange resin at a high efficiency, in addition to the above ion exchanging column 45, there are disposed an ion exchanging column 53 packed with the ion exchange resin 52 being desorbed and an ion exchanging colum 55 packed with the ion exchange resin 54 being regenerated. $H_2SO_4$ is added to the ion exchange resin 52 from a sulfuric acid storage tank 56, whereby ammonia adsorbed on the ion exchange resin is desorbed. Water is fed to the ammonia-desorbed ion exchange resin 54 from a water storage tank 54 for storing water refined at the separator 48, and the ion exchange resin 54 is washed with water and regenerated. The ion exchange resins 44, 52 and 54 which have thus passed through adsorption, desorption and regeneration steps, respectively, are packed again into the ion exchanging columns 53, 55 and 45 for desorption, regeneration and adsorption, respectively. The liquids used in the columns 53 and 55 for desorption and regeneration are introduced into a tank 58 and stored in the form of a solution of $(NH_4)_2SO_4$.

The present invention will now be described in detail by reference to the following Examples that by no means limit the scope of the invention.

EXAMPLE 1

A 100-l capacity stainless steel digestion tank equipped with a temperature-maintaining jacket and an agitator was charged with 50 Kg of excessive activated sludge formed at the city sewage treatment (having a solid concentration of 3.9% by weight and an organic content of 59% by weight in the solid) and 5 Kg of seed digestion sludge prepared by using the above activated sludge (having a solid concentration of 2.0% by weight and an organic content of 50% by weight in the solid), and digestion was conducted under anaerobic conditions at a temperature of 50° C. and an agitation rate of 100 rpm until generation of digestion gas substantially ceased (for about 40 days). The digested liquid was kept stationary for 5 hours, and 30 l of the supernatant was collected and used as a sample of waste water. The sample was found to have a BOD concentration of 450 ppm, an $NH_4$-N concentration of 320 ppm, a $PO_4^{3-}$-P concentration of 61 ppm, a total N concentration of 395 ppm and a total P concentration of 70 ppm.

At first, 15 Kg of slaked lime was added to 30 l of the above treated waste water (having a pH of 7.4) maintained at 50° C. under agitation to adjust the pH to 10.0, and the mixture was subjected to the reduced pressure distillation under a pressure of 50 mmHg at a temperature of 38° to 48° C. in a 80-liter capacity stainless steel condensation boiler to obtain 30 l of a distillate. By this reduced pressure distillation, 97% of $NH_4$-N in the starting treated waste water was recovered. Then, Amberlite IRC50 (manufactured by Rhom & Haas Co.) activated to the $H^+$ type was added in an amount of 25 ml as measured in the wetted state to the so recovered distillate, and the mixture was agitated for 5 minutes at room temperature to make $NH_4^+$ adsorbed in the ion exchange resin substantially quantitatively.

Then, the treated water was separated from the ion exchange resin by decantation, and 40 ml of 0.1N sulfuric acid was added to the resin to adjust the pH to 4 and elute $NH_4^+$ adsorbed in the resin. Then, the resin was gradually washed with 40 ml of water obtained at the above-mentioned step of subjecting the $NH_4^+$-adsorbed resin to the solid-liquid separation, and the pH was adjusted to 6 and the regenerated resin was separated from the washing water. The above eluent was combined with the washing water to obtain 78 ml of a solution of ammonium sulfate as a by-product.

Separately, 100 l of $CO_2$ gas was blown in the form of fine bubbles at room temperature under atmospheric pressure into the residual liquid obtained at the reduced pressure distillation step to form a precipitate of calcium carbonate. The precipitate-containing liquid was transferred into a sedimentation tank where it was allowed to stand still for 1 hour to separate it into the precipitate and 28 l of the supernatant having a pH of 7.1. The so obtained supernatant was subjected to the standard activated sludge treatment at room temperature for a residence time of 6 hours under a BOD volume load of 0.6 Kg/$N^3$d at an aeration rate of 400 $N^3/N^3$d. The treated liquid was then transferred to a sedimentation tank and the sludge was removed from the liquid. Thus, there was recovered a treated liquid having a BOD concentration of 22 ppm, an $NH_4^+$-N concentration of 5 ppm and a $PO_4^{3-}$-P concentration of 0.9 ppm.

EXAMPLE 2

Slaked lime (25 g) was added under agitation to 40 l of a liquid (having a BOD concentration of 5500 ppm, an $NH_4^+$-N concentration of 700 ppm, a $PO_4^{3-}$-P concentration of 110 ppm, a total N concentration of 750 ppm and a total P content of 130 ppm) which was obtained by subjecting urine to an anaerobic digestion treatment (medium temperature fermentation; residence time = 40 days), to adjust the pH of the liquid to 10. The liquid was charged in a stainless steel ammonia gasification tank having a diameter of 35 cm and a height of 60 cm, and while the temperature was being maintained at 50° C. by a jacket, air was fed into the tank at a rate of 2 l/min from the bottom of the tank by means of a diaphragm pump, and the discharged gas was passed through a column having an inner diameter of 3 cm and a length of 20 cm and packed with Amberlite IRC50 (the $H^+$ type) in an amount of 100 ml in the wetted state and recycled via a flow meter. When aeration was conducted for 10 minutes, 95% of $NH_4^+$-N in the sample liquid was removed and adsorbed in Amberlite IRC50. Then, the column was dismounted, and 80 ml of 0.1N hydrochloric acid was gradually added from the top of the column and a solution of ammonium chloride was withdrawn from the bottom of the column. The resin was gradually washed with 80 ml of water to regenerate the resin, and the above eluent was combined with the washing liquid and a solution of ammonium chloride was recovered.

Separately, $CO_2$ gas was blown in the form of fine bubbles at room temperature under atmospheric pressure into the residual liquid left in the ammonia gasification tank to form a precipitate of calcium carbonate. The precipitate-containing liquid is transferred into a sedimentation tank and allowed to stand still for 1 hour, whereby 35 l of the liquid was separated from the precipitate. The pH of the recovered liquid was 7.2.

Then, the liquid was diluted with water so that the volume of the dilution was 10 times the volume of the liquid, and the dilution was subjected to the standard activated sludge treatment at room temperature for a residence time of 6 hours under a BOD volume load of 0.5 Kg/$N^3$d and at an aeration rate of 400 $N^3/N^3$d. The treated liquid was transferred into a sedimentation tank to remove the sludge. A treated liquid having a BOD concentration of 25 ppm, an $NH_4^+$-N concentration of 6 ppm and a $PO_4^{3-}$-P concentration of 1.2 ppm was recovered.

Treated waste water formed by subjecting waste water having a high BOD concentration to the anaerobic digestion treatment is preferably employed as the starting treated waste water in the present invention. However, the present invention can be applied to any of other treated waste waters which have been subjected to the anaerobic digestion treatment. In the present invention, higher $NH_4^+$ and $PO_4^{3-}$ concentrations are preferred, and as the temperature of the treated waste water is higher, better results are obtained, because the quantity of heat fed for separation of ammonia can be reduced.

As will be apparent from the foregoing illustration, according to the present invention, there are provided a process in which nitrogen, phosphorus and BOD can be removed effectively from anaerobically treated waste waters and occurrence of secondary pollution by nitrogen, phosphorus and BOD can be remarkably prevented. When the treatment process and apparatus of the present invention are combined with the anaerobic digestion treatment system, nitrogen, phosphorus and BOD can be effectively removed at low costs. More specifically, by rendering anaerobically treated waste waters alkaline, $NH_3$ can be kept in the easily-gasifying state and the phosphoric acid ion can be effectively fixed. Further, by blowing-in of digestion gas, suspended solids composed mainly of calcium phosphate, organic solids and iron sulfide, which can hardly be separated by liquid-solid separation, can be deposited on flocks of calcium carbonate and solid-liquid separation can be performed effectively with ease. Moreover, the ammonia-adsorbed ion exchanger can easily be regenerated by washing it with water formed as a by-product at gasification of ammonia, and it can be used repeatedly at a high efficiency.

If nitrogen and phosphorus recovered according to the present invention are combined with the sludge obtained at the aerobic treatment, an organic fertilizer containing nitrogen and phosphorus at effective concentrations can be obtained. More specifically, if the $(NH_4)_2SO_4$ solution and $Ca_3(PO_4)_2$ recovered according to the present invention are mixed with the sludge at an appropriate ratio and the mixture was dried, an organic fertilizer containing nitrogen and phosphorus necessary for growth of plants at suitable concentrations can be obtained.

What we claim is:

1. A process for reducing BOD, nitrogen and phosphorus concentration from the effluent produced in the liquid-solid separation of anaerobically digested biochemical waste solution having in it ammonia and phosphorous, comprising the steps of:

(1) anaerobically digesting biochemical waste having phosphorous and nitrogen to produce carbon dioxide gas and anaerobically digested biochemical waste and thereafter separating by solid-liquid separation the anaerobically digested biochemical waste into anaerobically digested sludge and effluent having ammonia and phosphorous, (2) adding lime to the effluent to render the pH of the effluent within the range of 10.3 to 11.0 and to form calcium phosphate with said phosphorus, (3) separating ammonia in the form of aqueous ammonia distillate from the effluent by reduced pressure distillation at a pressure of 200 mm Hg or lower,
(4) adsorbing the separated ammonia in a weakly acidic ion exchange material,
(5) desorbing the adsorbed ammonia by reacting said ion exchange material with an acid to form an ammonia salt and regenerate the ion exchange material,
(6) blowing the carbon dioxide gas that was produced in step (1) into the effluent from which ammonia has been removed at the step (3), to form calcium carbonate, precipitate the calcium phosphate, formed in step 2, with the calcium carbonate, and separating said precipitate from the effluent, and
(7) subjecting the effluent from which the precipitate has been separated at the step (6), to aerobic digestion treatment within a pH range of 6.0–7.5 for removing said BOD therefrom.

2. A process according to claim 1, wherein said step (3) is performed at a pressure of 100 mm Hg or lower.

3. The process according to claim 2, wherein said weakly acidic ion exchange material is a resin.

4. The process according to claim 1, wherein said weakly acidic ion exchange material is a resin.

* * * * *